Patented June 19, 1928.

1,673,808

UNITED STATES PATENT OFFICE.

ELMER ANSON DANIELS, OF BERWYN, AND HARRY STIRLING SNELL, OF CHICAGO, ILLINOIS, ASSIGNORS TO WESTERN ELECTRIC COMPANY, INCORPORATED, OF NEW YORK, N. Y., A CORPORATION OF NEW YORK.

HARDENING RESINOUS EXUDATIONS WITH AN ORGANIC COMPOUND.

No Drawing.  Application filed August 21, 1924. Serial No. 733,447.

This invention relates to improved compositions of matter and methods of producing the same.

Objects of the invention are to produce an improved composition of matter having a resinous exudation as its base and to provide a method for producing the improved composition.

According to the main features of the invention, a resinous exudation, preferably shellac, is treated with a suitable quantity of the sodium salt of beta-naphthol in such a manner as to cause a reaction to take place between the two materials to form a hard condensation product which is resistant to ordinary shellac solvents and which remains relatively hard at temperatures considerably above the temperature at which natural shellac softens and becomes tacky. The methods of incorporating the two materials and producing the reaction may vary. Good results, however, are obtained by dissolving the shellac in alcohol and then introducing the sodium beta-naphtholate alone or dissolved in a solvent in sufficient quantities to produce the degree of hardness desired. The alcohol is then removed by evaporation and the combined materials heated to cause a chemical reacting which produces the condensation product desired.

Pressure may also be employed during heating and may be used satisfactorily for the double purpose of hastening the reaction and at the same time forming an article from the condensation product.

Besides sodium beta-naphtholate other organic compounds belonging to the same general group may be employed, the monohydric and polyhydric alcohols both of the aliphatic and aromatic series and their metallic compounds being capable of use as hardeners with the shellac. Examples of compounds of this general class which have been found to give good results are beta-naphthol, alpha-naphthol, glycerol, and phenol. The degree of hardness obtainable will vary to some extent depending upon which one of the materials of the group is employed. Any one of them, however, may be used for the purpose and the hardened resinous exudate produced thereby may be employed as a component part of improved molding compositions.

To produce a molding composition with shellac hardened in the manner described above as an ingredient, suitable fillers may be incorporated therewith before the condensation of the shellac and hardener. The reaction may then be made to take place so as to bind the fillers and the condensation product into a homogeneous mass. Various types of fillers may be employed depending upon the article desired. Examples of such fillers are: asbestos fibre, cotton flock, infusorial earth, wood flour and the like.

The preferred method of producing molding compositions comprising shellac and suitable fillers is to dissolve the shellac in a suitable solvent, for example, alcohol, and then add the condensing agent in the manner described above. Into this solution is then introduced a suitable amount of the filler to be employed. All of the ingredients are then thoroughly mixed together, the alcohol removed by evaporation and finally the resultant dry powder molded by means of heat and pressure into the article to be produced.

A suitable mixture comprising wood flour as a filler, which when completed can be employed as a substitute for wood or other materials, may have the following proportions: shellac, 50 pounds; denatured alcohol, 15 gallons, sodium beta-naphtholate, 0.5 pounds; and wood flour, 300 pounds. This mixture is treated in the manner described above to produce a dry powder after which it is molded by heat and pressure into the shape desired.

A specific molding process which has given uniformly good results consists in placing the powder in a suitable mold and subjecting it to a 2000 pound pressure per square inch for 10 or 15 minutes, during which time a temperature from 260° F. to 270° F. is maintained. After the material has been subjected to heat and pressure for a sufficient time to complete the chemical reaction, the source of heat is removed and the composition allowed to cool while still under pressure to a sufficiently low temperature to permit handling. The article produced in this manner is resistant to alcohol and will soften only very slightly below a temperature of 250° F. Although specific amounts of the ingredients and definite steps in the molding operation are disclosed above, the amounts of the ingredients, and the method employed in treating them may be varied over a wide range depending upon the type of final product desired.

A hardened shellac produced in the manner described herein can be used advantageously as the binder for an improved cork composition, such as that described in our copending application, Serial No. 724,950, filed July 29, 1924.

The term alcohol as employed in the appended claims refers to monohydric and polyhydric alcohols of both the aromatic and aliphatic series.

What is claimed is:

1. A composition of matter formed by the condensation of a resinous exudate and the sodium salt of beta-naphthol.

2. A composition of matter formed by the condensation of shellac and the sodium salt of beta-naphthol.

3. A method of hardening a resinous exudation, which consists in adding the sodium salt of beta-naphthol thereto, and heating.

4. A method of hardening a resinous exudation, which consists in adding the sodium salt of beta-naphthol thereto, and then subjecting the resulting mixture to heat and pressure.

5. A method of hardening shellac, which consists in adding the sodium salt of beta-naphthol thereto, and heating.

6. A method of hardening shellac, which consists in adding the sodium salt of beta-naphthol thereto, and then subjecting the resulting mixture to heat and pressure.

In witness whereof, we hereunto subscribe our names this 16 day of August A. D., 1924.

ELMER ANSON DANIELS.
HARRY STIRLING SNELL.